L. S. BACHE.
OILLESS BEARING.
APPLICATION FILED MAR. 17, 1914.

1,122,230.

Patented Dec. 22, 1914.

WITNESSES

INVENTOR
Leigh S. Bache,
BY
ATTORNEY

UNITED STATES PATENT OFFICE.

LEIGH S. BACHE, OF BOUNDBROOK, NEW JERSEY, ASSIGNOR TO THE GRAPHITE LUBRICATING COMPANY, OF BOUNDBROOK, NEW JERSEY, A CORPORATION OF NEW JERSEY.

OILLESS BEARING.

1,122,230.  Specification of Letters Patent.  Patented Dec. 22, 1914.

Application filed March 17, 1914. Serial No. 825,355.

*To all whom it may concern:*

Be it known that I, LEIGH S. BACHE, a citizen of the United States, and a resident of Boundbrook, in the county of Somerset and State of New Jersey, have invented certain new and useful Improvements in Oilless Bearings, of which the following is a full, clear, and exact description, whereby any one skilled in the art may make and use the same.

The invention relates to oilless bearings, that is, a bearing having inherent lubricating qualities.

It relates more particularly to a bearing which is designed to support a shaft having less than a complete revolution. Such bearings are largely used for springs and with any oscillating member which it is desired to lubricate.

The type of bearing herein illustrated and described consists of a metallic body-part having retaining grooves formed therein within which is tightly compressed and vulcanized a graphite lubricating compound.

The bearings must of necessity be comparatively thin as to their metallic parts and must be provided with a maximum body of lubricant in order to withstand the hard duty imposed upon them. This necessitates substantial bearing surfaces of metal and a sufficient quantity of metal to properly back up and hold the lubricant.

The principal object of the invention is to provide a bearing which will have a maximum strength as to its metallic part and which will provide a maximum surface contact of the lubricant which it contains.

It is also an object of the invention to vary the depth of the body of the lubricant so that it will be most effective with oscillating movements of a shaft.

It is also an object of the invention to provide a ready means for producing a bearing having the above qualifications and advantages.

Figure 1:
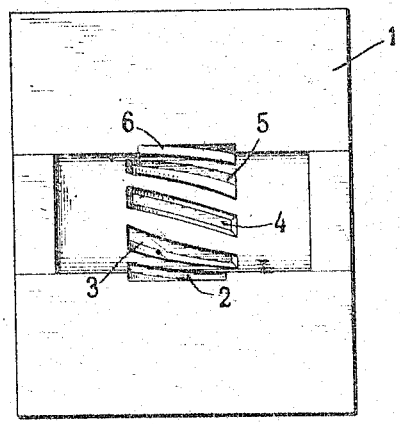
Figure 2:
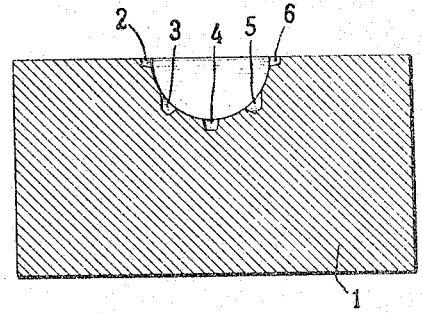
Figure 3:
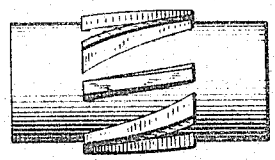
Figure 4:
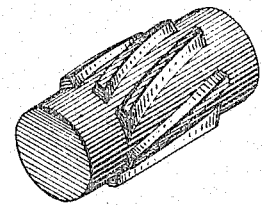
Figure 5:
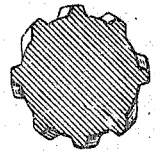
Figure 6:
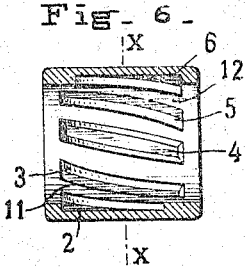
Figure 8:
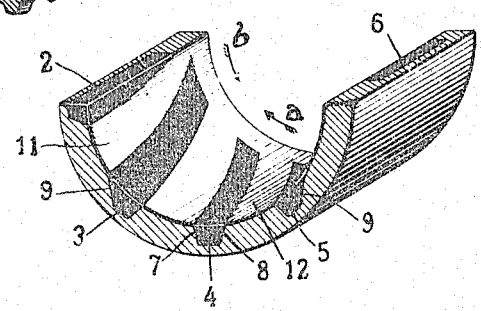
Figure 7:
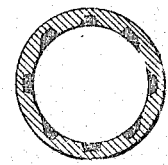

Referring to the drawings: Figure 1 is a plan view of a core-box for producing cores for the bearing. Fig. 2 is a cross sectional view of the core-box. Fig. 3 is a view in side elevation of the core. Fig. 4 is a perspective view of the core. Fig. 5 is a cross sectional view of the core. Fig. 6 is a sectional view of one-half of the bearing casing. Fig. 7 is a cross sectional view on the line $x-x$ of Fig. 6. Fig. 8 is an enlarged fragmentary section illustrating the varying depths of the retaining pockets.

It is essential that the interior grooves for a self-lubricating bearing terminate just short of the ends of the bearing so that the inserted lubricant will be confined and will have no opportunity of working loose at the ends of the bearing shell. Heretofore it has been a common practice to form grooves of various characters in the interior of a metallic bearing shell and fill said grooves with a lubricant such as a compound of graphite.

In order to secure the necessary lubrication, it has been a common practice to provide spiral grooves and these of necessity have had to be arranged in such numbers and juxtaposition that the metallic bearing surface has been greatly weakened and reduced.

Where used under heavy duty as, for instance, in a spring shackle where there is a continuous oscillating movement, it has been almost impossible to arrange lubricating grooves which would be ample for properly lubricating the bearing and at the same time provide a sufficient body of metal to support the weights. If a sufficient depth of pocket was formed with a sufficient face, the metallic portion was very much weakened and, under heavy duty, where subjected to unusual wear, the lubricant has been dislodged and worked out of the bearing. The real cause for this may be attributed to the lack of depth and proper distribution of the mass of lubricant. Owing to the required thinness of the metallic shell, the depth of groove has been limited as well as the surface face. Furthermore, it has been practically impossible to secure a proper conformation of grooves which could be cast in the metal to provide clean retaining pockets for the graphite. This has been due to the fact that with the spiral grooves extending more than half about the bearing, a proper draft could not be secured on the cores and still maintain a groove of proper conformation and size to give the requisite lubricating qualities.

The invention herein described overcomes these objections and provides a special form of groove which has all the advantages of the spiral groove and permits casting of the shell with its contained grooves or pockets in such form and size as to give a maximum strength of metal with a maximum lubricating effect.

Referring to the drawings the numeral 1 denotes the lower half of a core-box which is provided with grooves 2, 3, 4, 5 and 6. Each of the grooves 3 to 5 inclusive represent what is in effect a spiral tooth form which extends transversely of the central axis of the core but is of such a pitch that the core may be readily drawn from the box. The grooves 2 and 6 represent one-half of such a tooth.

As illustrated in Fig. 8, the groove 4 is arranged at the bottom of the lower segment and is relieved at its sides 7, 8 so that it will permit ready withdrawal of the core. The grooves 3 and 5 arranged on opposite sides of the central groove 4 are cut away on one side as at 9 so that there is in effect a tapered wall from the bottom of the groove 10 which provides for ready relief and withdrawal of the core. The grooves 2 and 6 represent one-half of the spiral tooth and obviously, will permit drawing with facility.

In practice, the core-box section 1 is used to produce the lower half of the core as well as the upper half, but when two core sections have been formed, one is reversed with reference to the other and produces the complete core of Figs. 3 to 5.

It is apparent that the grooves 2 to 6 are so spaced that there is a full and ample metal support between them. There is a very substantial body of metal on either side of the central groove 4 which takes the greatest portion of weight in a spring bearing.

It is apparent that the alternate grooves throughout the bearing shell, while of the same width as the intermediate grooves at their base, have a much wider face owing to the fact that one side of the groove is cut away so that it provides a wide opening. It follows that there is a comparatively wide face of lubricant for the alternate grooves and yet there is a substantial mass of metal on either side of the intermediate grooves. The cutting away or beveling of the alternate grooves at one side does not materially decrease the strength of the shell and therefore there is a maximum shell strength with a maximum lubricating surface.

Aside from the facility afforded in casting, the form of the pockets or grooves 3 and 5 have particular advantages.

As illustrated, in Fig. 8, with an oscillatory movement, there is a tendency always to wipe the graphite or other compound from the grooves onto the intermediate metallic surfaces and it is apparent that the perpendicular thrust of the shaft on the pockets 3 and 5 is supported upon a maximum depth of graphite. As the shaft is oscillated in the direction of the arrow $a$, there is a tendency for the graphite to work from the pocket 3 onto the metallic surface 11, and simultaneously, there is a tendency for the lubricating compound in the pocket 5 to be more firmly compressed into the deepest portion of the pocket 5. As the shaft is oscillated in the direction of the arrow $b$, there is a tendency to compress the lubricant into the pocket 3 and work the lubricant from the pocket 5 onto the metallic surface 12 as illustrated in Fig. 6.

It will be noted that the tapered pockets 3 and 5 rest on opposite sides of the central pocket 4 and of course, if the shaft picks up a sufficient quantity of graphite from said pockets in its oscillation, it will carry the lubricant over the intermediate metallic surface. This arrangement gives a substantial base for the bearing and unusual distribution of metal to provide strength. Furthermore, the bearing surface of the lubricant in the pockets 3 and 5 is very much increased without decreasing the supporting strength of the metal casing. It is obvious that with straight-cut threads or pockets, reliance must be placed upon the shaft picking up a sufficient quantity of lubricant from surface contact with the material and where sharp edge grooves are formed of comparatively narrow face or width, the metal must be worn away until the shaft can bear firmly upon the lubricant and thus secure its supply. As illustrated herein, the wide contact faces of the lubricant give an ample supply and as the pockets are of varying depth, a sufficient body of the lubricant may be provided for all purposes. It will not work out of the pockets as the oscillatory movement first tends to wipe the material away and then brings it back and compresses it into the main body of the graphite in the pockets. The grooves or pockets terminate just inside the ends of the bearing shell so that there is no possibility of the material being forced out of the ends of the grooves or pockets. In practice, a sufficient quantity of the lubricant is carried over onto the metal between the ends of the pockets and the ends of the bearing.

Obviously, the exact pitch and form of the grooves or pockets need not be strictly adhered to so long as the alternate pockets are of varying depth to provide extended and wide bearing surfaces of the lubricant. The number of grooves may be varied at will to suit the exigencies of any particular case.

Spiral grooves for bearings have been hereinabove referred to and have been practically disclaimed. Reference to this spiral groove formation indicates a groove which is actually of spiral thread formation extending about the bearing. The present invention, while referring to spiral grooves, is presumed to be defined by the grooves of general spiral formation extending axially of the bearing and not progressing with a sufficiently quick pitch to encircle the bearing. Such a spiral groove as herein referred to provides for compacting and working of the lubricant along the lines of the groove and over the intermediate metallic surfaces and provides what has not been possible in devices of the prior art so far as known, namely, an ample body of metal for weight-sustaining purposes and grooves so arranged that the alternate grooves present comparatively wide faces of lubricating material without unduly weakening the metallic shell.

What I claim as my invention and desire to secure by Letters Patent is:

1. A bearing shell having spirally arranged grooves, the alternate grooves of long pitch being cut away at one side to provide a wide opening and a lubricant filling said grooves.

2. A bearing shell having spirally arranged grooves of long pitch, the alternate grooves being cut away at one side to provide a wide opening, said grooves terminating within the ends of the bearing shell and a lubricant filling said grooves.

3. A bearing shell having spirally arranged grooves of long pitch, said grooves having the same depth and width at their bottoms and the alternate grooves being cut away at one side to provide wide openings and a lubricant filling said grooves.

4. A bearing shell having a series of spiral grooves of substantially uniform depth and width at their bottom and with the alternate grooves cut away to provide a beveled wall and an opening of greater area than the area of the intermediate grooves, said grooves being of spiral formation and of long pitch extending substantially axially of the bearing and a lubricant filling said grooves.

5. A bearing shell having a series of grooves of long pitch spiral form extending slightly transverse to the axis of the shell, the alternate grooves being cut away at one side to provide a substantially wide opening for a lubricant and a lubricant filling said grooves.

6. A bearing shell having a series of spirally arranged grooves, said grooves extending less than 45° about the axis of the shell, the alternate grooves being cut away at one side to provide a substantially wide opening for a lubricant and a lubricant filling said grooves.

LEIGH S. BACHE.

Witnesses:
S. A. KING,
L. V. ROUSSEAU.